Nov. 25, 1958     J. H. GRAY     2,861,383
BEADED FISH HOOK DISGORGING DEVICE
Filed Dec. 10, 1956
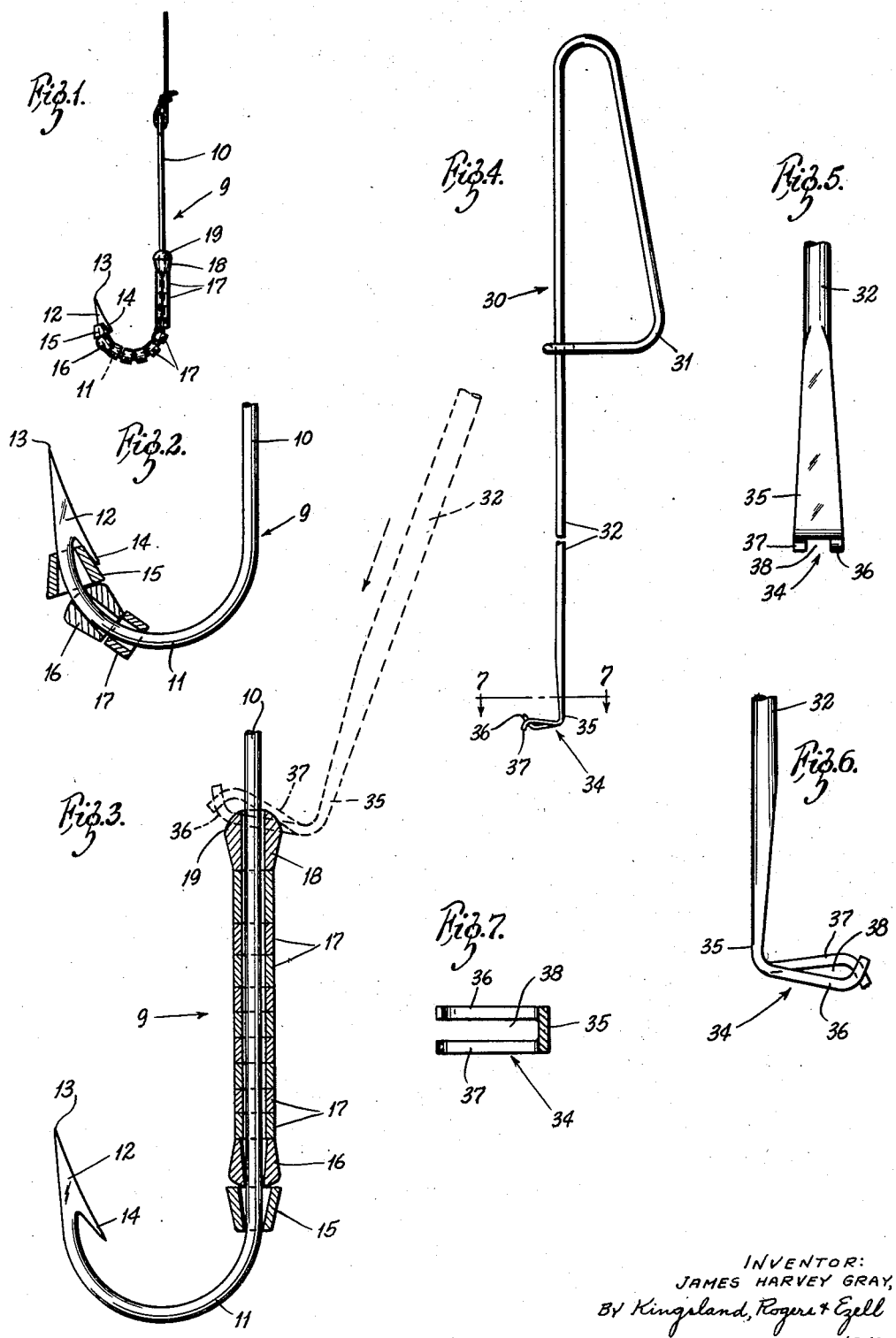
INVENTOR:
JAMES HARVEY GRAY,
By Kingsland, Rogers & Ezell
ATTORNEYS

United States Patent Office 2,861,383
Patented Nov. 25, 1958

2,861,383

BEADED FISH HOOK DISGORGING DEVICE

James Harvey Gray, Clayton, Mo.

Application December 10, 1956, Serial No. 627,351

4 Claims. (Cl. 43—53.5)

This invention relates to improvements in fish hooks, and in particular is concerned with a fish hook provided with beads which are adapted to be moved by a fish hook disgorging tool to remove the hook from the fish.

Fishermen have, in the past, encountered a great deal of difficulty in removing the conventional barbed fish hook from a fish after it has been landed, without additional injury to fish or lacerations to the hands. This is quite often due to the fact that the bait and hook have been swallowed by the fish which makes access difficult or the barb is caught in cartilaginous or bonelike material which strongly resists the disengagement of the barb. Various attempts have been made to provide tools for disgorging the fish hook from the fish, and these have sometimes taken the form of complicated plier-like mechanisms, probes, and the like which tear the flesh of the fish ultimately causing the death of the fish if released. Conservationists have strongly advocated barbless hooks that minimize injury of fish being released. The hook of this invention is equivalent to barbless in this respect. Touching fish with hands is also harmful as it breaks or removes part of the protective film covering the scales. In most cases the fish is hooked shallowly in the mouth. The fish need not be touched by hands in releasing this hook, when such is the case.

By means of the instant invention, there has been provided a fish hook equipped with a plurality of slidable beads, which are movable along the shank and curved hook portion of the hook into mating engagement with the barb to render the rear point of the barb ineffective so that the hook may be easily removed from the fish. These beads are maintained on the shank and hook portion of the hook in slidable relationship so that the hook may be easily baited without interference by the beads. Movement of the beads into the barb-releasing position after the fish has been hooked is effected by a special tool of this invention whereby access to the hook may be easily made even when the hook is deeply embedded in the fish. The tool of this invention is provided with a bead contacting head positioned in such a manner that the beads may be moved to their barb-releasing position regardless of the location of the hook inside the fish.

The beaded hook of this invention is simple in construction and very effective in its operation without detracting from the efficacy of the barbed hook to firmly hook the fish. The beaded hook may be inexpensively made with the beads constructed of plastic, glass, or other standard materials of construction which, in the case of plastics or glass, may be either translucent or any desired color. The entire combination of the beaded fish hook and the bead moving tool is simple in construction, inexpensive to manufacture and adapted to be used by any fisherman without any special training.

Accordingly, it is a primary object of this invention to provide a fish hook having movable beads thereon which can render the barb of the hook ineffective for easy removal of the hook from a fish.

It is a further object of this invention to provide a fish hook having a plurality of beads movable upon the shank and hook portion of the hook in which the leading bead closest to the barbed point of the hook has a wedged shape or tapered exterior of an expanding nature so that it may expand the flesh of the fish and nest underneath the barb to render the barb ineffective for easy removal of the hook from the fish and in which the bead adjacent the leading bead has a generally tapering surface in a direction away from the barb and in which the other beads have a reduced diameter to minimize the friction of the hook with the flesh of the fish as it is disengaged.

Still a further object of this invention is to provide a bead moving toool which may be used with a beaded fish hook to move the beads along the shank and hook portion of the hook into a barb-releasing position.

Yet a further object of this invention is to provide a tool having a bifurcated head member comprising oppositely curved bead contacting elements whereby the tool may be employed in a self-guiding manner to move beads on the shank and hook portion of the hook to a barb-releasing position regardless of the location of the hook within a fish.

Still another object of this invention is to provide a beaded fish hook and bead-moving tool which can be simply constructed and easily operated.

Further objects of this invention will appear in the detailed description which follows and will be further apparent to those skilled in the art.

In the drawings, a preferred embodiment of the beaded fish hook and the bead-moving tool are shown for the purpose of illustration. It is to be understood that these drawings are for the purpose of example only and that the invention is not limited thereto.

In the drawings:

Figure 1 is an elevational view showing the beaded fish hook;

Figure 2 is an enlarged fragmentary view taken through the axis of a portion of the beads showing the lead wedging bead in the barb disengaging position;

Figure 3 is an enlarged elevational view showing the beads in section in such a position as might be encountered where the hook is baited with the bait being on the hook portion or where the hook is embedded in a fish with the fish hooked between the barb and the wedging bead while the bead-moving tool is shown in dotted lines at the beginning of its barb-disengaging operation;

Figure 4 is a side elevational view of the bead-moving tool;

Figure 5 is an enlarged fragmentary view in front elevation of the bottom of the tool showing the bead-contacting elements taken from the right side of Figure 4;

Figure 6 is an enlarged view in side elevation of the bottom bead contacting portion of the tool, taken from the opposite side of Figure 4; and Figure 7 is an enlarged view in section showing the bottom of the bead-moving tool taken on the line 7—7 of Figure 4.

The beaded hook of this invention is generally indicated by the numeral 9 and is shown in Figures 1, 2 and 3. As therein shown, the hook, per se, is of conventional configuration and comprises a shank 10, a rounded hook portion 11 and a pointed hook 12 having a point 13 and a barb 14. In general, any type of barbed hook may be employed in this invention including the treble hooks used with artificial bait.

The beads, as best shown in Figures 2 and 3, comprise a tapered leading bead 15 which has a generally frusto-conical configuration. A first spacing bead 16, also of frusto-conical configuration, is positioned to the rear of the wedging bead with respect to the hook and is followed by a plurality of spacing beads 17. A pushing bead 18 having a rounded top 19 is the last bead placed on the hook. The rounded top provides for easy access and gripping of the bead moving tool as will further appear.

All the beads may be constructed of plastic material or glass so as to be translucent or may be made in any color from other standard materials of construction. It will be noted that the openings in the beads are either large enough or tapered to provide for movement along the shank 10 and the curved hook portion 11 without binding. It will be further observed that the conical configuration of the bead 16 provides a reverse taper with respect to the barb whereby the remaining beads may be easily passed through the expanded flesh of the fish. Once the barb is disengaged by contact with the leading bead the remaining beads will therefore offer little resistance since this is further facilitated by the smaller diameter of these beads.

The bead-moving tool is generally indicated by the reference numeral 30 in Figure 4. It comprises a handle portion 31, a long shank 32 and a bifurcated bottom portion 34. The bottom portion 34 is more particularly shown in Figures 5, 6 and 7 where it will be seen that the bottom part of the tool 35 is somewhat flattened and the bead contacting elements 36 and 37 may be hammered or stamped out of the wire used in the manufacture of the rest of the tool. As best appears in Figures 4 and 6, the one element 36 is hooked upwardly while the other element 37 is hooked downwardly. By means of this positioning, the bifurcated elements 36 and 37 may be moved along the shank of the hook in guided relation by the intermediate groove 38 in such a position that the hooked portion of either the element 36 or 37 will contact the curved top portion 19 of the bushing bead 18 regardless of where the hook is positioned within the interior or mouth of the fish or whether the tool is used to push or pull the beads to the barb disengaging position.

Use

In use, the beaded fish hook may be employed with the desired hooks on artificial bait or with live bait in such a manner that the bait may be hooked directly covering the beads or under the beads in the position shown in Figure 3, where the bait is placed on the hook between the barb 15 and the lowermost wedging bead 15. Alternatively the beaded fish hooks may be employed on artificial bait or any type of lure using a barb. In any case, when the fish strikes the hook and the pointed hook 13 and barb 14 are driven through part of the fish, the resistance of the flesh of the fish to the movement of the beads will drive them upwardly on the shank to the general position shown in Figure 3.

After the fish has been hooked, the beads may be moved to a barb-disengaging position shown generally in Figure 2 where the wedging bead nests between the hook portion 11 and the barb 14. This merely spreads the wound caused by the barb without further laceration of the flesh. This action may be accomplished by the use of the bead moving tool 30 which is employed as shown in dotted lines in Figure 3. With the beads driven upwardly to the position shown and with the hook in the upright position in the fish so that the point 13 is directed generally toward the mouth of the fish, the beads may be forcefully moved by the tool along the shank and the hooked portion 11 which thereby expands the flesh of the fish in the area through which the hook passes until the wedging bead 15 nests underneath the barb. As noted in Figure 3, the hook element 37 will hook over the rounded portion 19 of the pushing bead while the other element will aid in the gripping of this bead.

Self-engagement of the bead-moving and hook-disgorging tool 30 is provided by the bifurcated bottom portion since the groove 38 may be positioned along the fish line or leader and then moved onto the shank in guided relation. Once the beads have been moved by the tool to the position shown in Figure 2, the barb will be seen to be effectually disengaged or rendered ineffective and the tool then becomes an extension of the shank of the hook, by virtue of pulling the leader taut, which holds the hook solidly to the end of the tool. After this has been accomplished, the hook may then be simply and easily disengaged from the interior of the fish in the conventional manner.

If the fish is hooked in the mouth, as is usually the case, the beads may be pulled (instead of pushed) against the barb. In this operation, instead of the relationship shown in Figure 3, the tool 30 instead of pointing upwardly will point downwardly and the hook element 36 will nest around the rounded top portion 19 of the pushing head 18. Then, by pulling on the leader with one hand and pulling in the opposite direction with the tool, the hook may be rotated to an inverted position which will allow the fish to fall off without touching it with the hands.

It will be apparent that there has been provided a beaded fish hook and a bead-moving tool which may be very effectively used together. Through the use of the beaded fish hook, the beads may be easily moved to disengage the barb from action and thereby render the hook freely removable from the fish or the fish from the hook. The bead-moving tool is very simply employed to move the beads regardless of the location of the hook within the interior of the fish, and it will be apparent that the beaded hook and tool can be very simply and efficiently employed.

Various changes and modifications may be made in the beaded fish hook and the bead-moving and disgorging tool as will be apparent to those skilled in the art. Such changes and modifications are within the scope and teaching of this invention, as defined by the claims appended hereto.

What is claimed is:

1. Apparatus for disgorging a barbed hook from a fish, said apparatus comprising means movable upon the hook into a barb-disengaging position, said means comprising a plurality of bead shaped elements having openings therethrough, said beads being loosely positioned upon the hook with the shank and curved portion of the hook passing through the openings, and the bead nearest the barb having a frusto-conical form for positioning it in mating relation underneath the barb upon said curved portion of the hook.

2. The apparatus of claim 1 wherein the frusto-coincal form includes a cross-sectional diameter at a point approximately half the height of the bead such that the bead will be engaged beneath the bar and its outer surface will form an extension of the barb.

3. Apparatus for disgorging a hook from a fish, said apparatus comprising means movably mounted upon the shank of a barbed hook for movement into a barb disengaging position, said means including a perforate element movable upon the straight and curved portion of the hook to occupy a position adjacent the barb, said element having a frusto-conical exterior adapted to underlie the barb so as to render the latter ineffective to catch on the body of a fish.

4. Apparatus for disgorging a hook from a fish, said apparatus comprising means movable upon the hook into a barb disengaging position, said means comprising a plurality of perforate beads loosely positioned upon the hook with the shank and curved portion of the hook passing through the beads, the bead nearest the barb having a longitudinally tapered exterior for positioning it in mating relation beneath the barb upon said curved portion of the hook, and the bead farthest from the barb having a rounded surface adjacent for ready engagement with a disgorging tool, whereby an operating tool may be engaged with the bead farthest from the barb for moving said beads along the hook and against the barb to facilitate disengagement of the barb from the body of the fish.

References Cited in the file of this patent

UNITED STATES PATENTS

| | | |
|---|---|---|
| 1,957,799 | Peterson | May 8, 1934 |
| 1,990,693 | Hildebrandt | Feb. 12, 1935 |
| 2,289,767 | Ford | July 14, 1942 |
| 2,636,304 | Swenson | Apr. 28, 1953 |
| 2,695,471 | Imberti | Nov. 30, 1954 |

FOREIGN PATENTS

| | | |
|---|---|---|
| 470,220 | Great Britain | Aug. 11, 1937 |